(12) United States Patent
Jarrot et al.

(10) Patent No.: US 11,990,948 B2
(45) Date of Patent: May 21, 2024

(54) SUBSEA TELECOMMUNICATION SYSTEM

(71) Applicant: ONESUBSEA IP UK LIMITED, London (GB)

(72) Inventors: Arnaud Jarrot, Somerville, MA (US); Andriy Gelman, Somerville, MA (US); Neil Herbst, Houston, TX (US)

(73) Assignee: OneSubsea IP UK Limited, London (GB)

( * ) Notice: Subject to any disclaimer, the term of this patent is extended or adjusted under 35 U.S.C. 154(b) by 37 days.

(21) Appl. No.: 16/534,673

(22) Filed: Aug. 7, 2019

(65) Prior Publication Data
US 2020/0052799 A1 Feb. 13, 2020

Related U.S. Application Data

(60) Provisional application No. 62/716,759, filed on Aug. 9, 2018.

(51) Int. Cl.
*H04B 13/02* (2006.01)
*H04B 11/00* (2006.01)

(52) U.S. Cl.
CPC .............. *H04B 13/02* (2013.01); *H04B 11/00* (2013.01)

(58) Field of Classification Search
CPC .......... H04B 13/02; H04B 11/00; E21B 41/00
See application file for complete search history.

(56) References Cited

U.S. PATENT DOCUMENTS

| | | | | |
|---|---|---|---|---|
| 3,553,374 A | * | 1/1971 | Wolf | H04M 1/2155 |
| | | | | D14/242 |
| 5,303,207 A | * | 4/1994 | Brady | H04B 13/02 |
| | | | | 367/134 |
| 5,432,754 A | * | 7/1995 | Brady | H04B 11/00 |
| | | | | 367/134 |
| 5,579,285 A | * | 11/1996 | Hubert | G01S 11/14 |
| | | | | 367/133 |
| 7,835,228 B2 | * | 11/2010 | Laurent | H04L 27/2613 |
| | | | | 367/134 |
| 7,859,944 B2 | * | 12/2010 | Zhou | G01H 3/08 |
| | | | | 367/134 |
| 8,009,516 B2 | * | 8/2011 | Crowell | H04B 11/00 |
| | | | | 367/128 |
| 8,842,498 B2 | * | 9/2014 | Cahalan | G01S 3/808 |
| | | | | 367/134 |
| 9,030,918 B2 | * | 5/2015 | Liu | H04B 11/00 |
| | | | | 367/134 |
| 9,503,202 B2 | * | 11/2016 | Cahalan | H04B 13/02 |

(Continued)

OTHER PUBLICATIONS

Extended European Search Report for EP Application No. 19190993.6 dated Dec. 12, 2019; 10 pgs.

(Continued)

*Primary Examiner* — Isam A Alsomiri
*Assistant Examiner* — Vikas Atmakuri
(74) *Attorney, Agent, or Firm* — Jeffrey D. Frantz

(57) ABSTRACT

A subsea telecommunication system that includes a first acoustic modem that couples to a first vehicle and communicates acoustically. A second acoustic modem couples to a second vehicle and communicates acoustically with the first acoustic modem. A first computer system receives an environmental parameter and updates a physical layer parameter of the subsea telecommunication system in real time in response to the environmental parameter.

16 Claims, 3 Drawing Sheets

(56) References Cited

U.S. PATENT DOCUMENTS

| | | | | |
|---|---|---|---|---|
| 10,871,567 | B2* | 12/2020 | Embry | B63G 8/38 |
| 11,249,193 | B2* | 2/2022 | Embry | G01M 3/24 |
| 2008/0180273 | A1* | 7/2008 | Kyle | G01V 11/002 |
| | | | | 340/855.3 |
| 2011/0055746 | A1* | 3/2011 | Mantovani | B63C 11/26 |
| | | | | 715/771 |
| 2011/0177779 | A1* | 7/2011 | Rhodes | H04B 13/02 |
| | | | | 455/40 |
| 2011/0311228 | A1* | 12/2011 | Leivo | G06F 1/163 |
| | | | | 398/78 |
| 2012/0127833 | A1* | 5/2012 | Ghen | H04B 11/00 |
| | | | | 367/137 |
| 2012/0243375 | A1 | 9/2012 | Melvin, II et al. | |
| 2012/0312221 | A1* | 12/2012 | Vosburgh | B60L 53/80 |
| | | | | 114/331 |
| 2015/0109140 | A1* | 4/2015 | Probel | H03M 7/30 |
| | | | | 340/855.4 |
| 2015/0159481 | A1* | 6/2015 | Mebarkia | F17D 5/06 |
| | | | | 166/336 |
| 2016/0121009 | A1* | 5/2016 | Farr | G02B 19/0019 |
| | | | | 250/492.1 |
| 2016/0127042 | A1* | 5/2016 | Farr | H04B 10/11 |
| | | | | 398/104 |
| 2017/0300054 | A1* | 10/2017 | Hanson | B60F 5/02 |
| 2018/0217029 | A1* | 8/2018 | Billings | G01N 1/10 |
| 2018/0321385 | A1* | 11/2018 | Embry | G01V 8/10 |
| 2019/0011565 | A1* | 1/2019 | Embry | G01S 15/74 |
| 2019/0071962 | A1* | 3/2019 | Gottlieb | E21B 17/012 |
| 2020/0180740 | A1* | 6/2020 | Christ | B63B 23/34 |

OTHER PUBLICATIONS

Ahmed, S. et al., "Cognitive Intelligence in UAC Channel Parameter Identification, Measurement, Estimation, and Environment Mapping", IEEE, Piscataway, NJ, USA, May 11, 2009 (XP031540721), 14 pgs.

Schneider, Toby et al., "Model-Based Adaptive Behavior Framework for Optimal Acoustic Communication and Sensing by Marine Robots", IEEE Journal of Oceanic Engineering, IEEE Service Center, Piscataway, NJ, US, vol. 38, No. 3, Jul. 1, 2013 (XP011519285), 12 pgs.

Kaeli, Jeffrey W. et al., "Online Data Summaries for Semantic Mapping and Anomaly Detection with Autonomous Underwater Vehicles", Oceans 2015—Genova, IEEE, May 18, 2015 (XP033205637), 7 pgs.

Aydinlik M. et al., "A Physical Layer Implementation on Reconfigurable Underwater Acoustic Modem", Oceans 2008, IEEE, Piscataway, NJ, USA, Sep. 15, 2008, 4 pgs.

M. H. Hayes, "Statistical Digital Signal Processing and Modeling," Wiley; 1996, 17 pages.

* cited by examiner

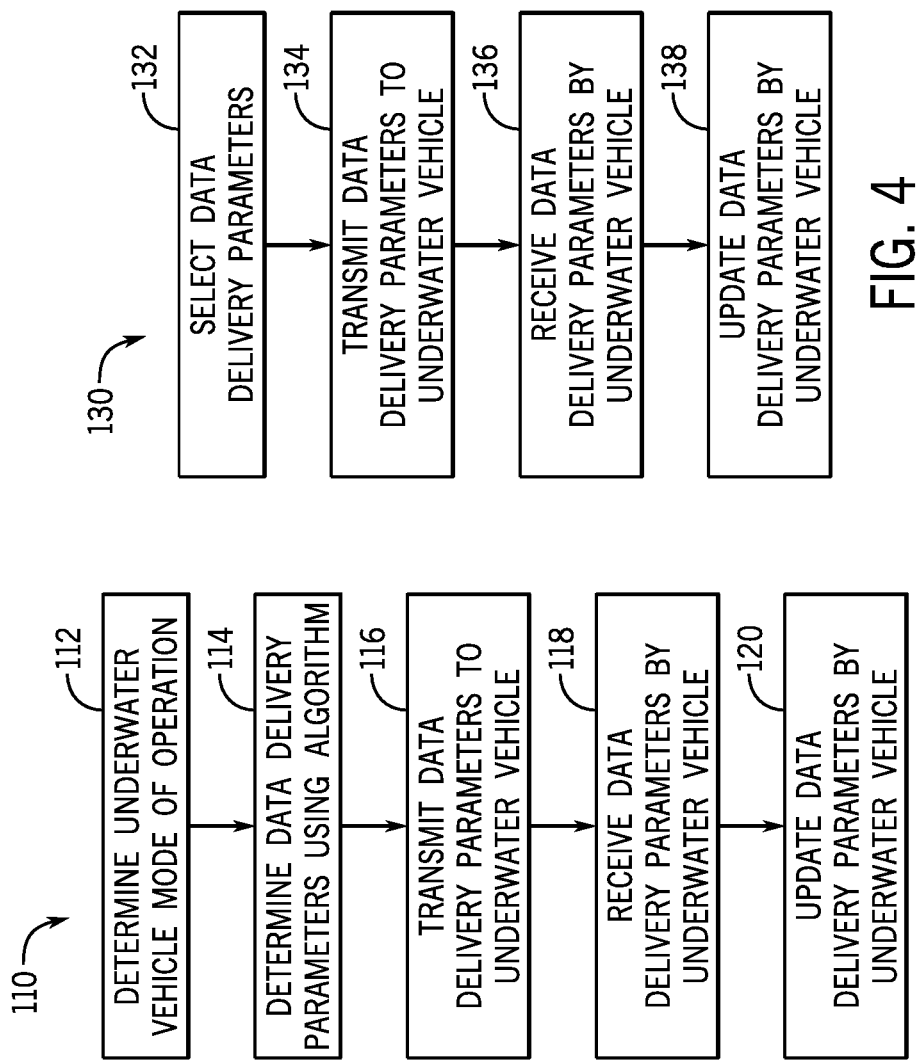
FIG. 3
FIG. 4
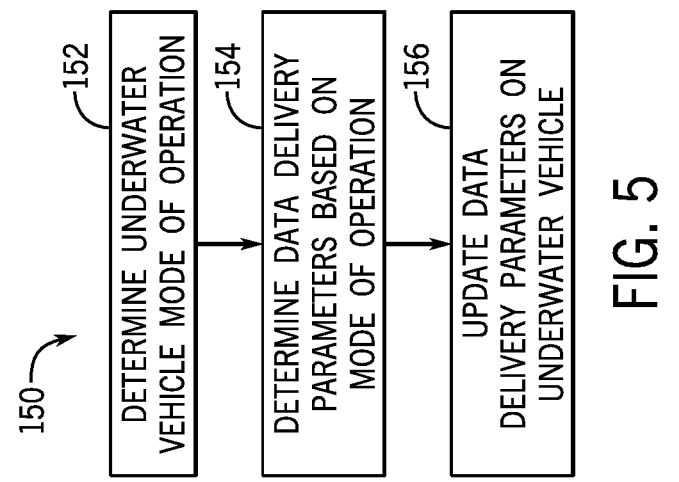
FIG. 5

SUBSEA TELECOMMUNICATION SYSTEM

CROSS-REFERENCE TO RELATED APPLICATIONS

This application claims priority from and the benefit of U.S. Provisional Application Ser. No. 62/716,759, entitled "ADAPTIVE UNDERWATER MODEM," filed Aug. 9, 2018, which is herein incorporated by reference in its entirety for all purposes.

BACKGROUND

The present disclosure relates generally to communication systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Once a desired subterranean resource is discovered, drilling and production systems are employed to access and extract the resource. These systems may be offshore depending on the location of the desired resource. Such systems generally include a wellhead, pumps, underwater conduits, and other equipment that enable drilling and extraction operations.

The costs associated with drilling, installing, and extracting these natural resources may be significant. Operators may therefore monitor the installation and operation of these systems to ensure desired operation, to comply with regulations, etc. However, the harsh sea environment and size of the equipment used in drilling and extraction operations, may make fixed equipment monitoring and cable connections undesirable. Operators may therefore use underwater vehicles to monitor these systems and equipment. The underwater vehicles may collect information regarding the operation and condition of the systems using a variety of sensors. The information collected by these sensors is transmitted to the surface using acoustic communication. However, the underwater acoustic environment is constantly changing. For example, changing thermoclines and water temperatures as well as acoustic energy generated by subsea equipment and surface vessels may interfere with data transfer from the underwater vehicles. Unfortunately, tuning communications equipment in response to these changing conditions involves bringing an underwater vehicle to the surface and updating communication parameters using a physical connection or a Wi-Fi link. Surfacing the underwater vehicle may therefore waste time and money as equipment and personnel are unable to perform other tasks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a subsea telecommunication system includes a first acoustic modem that couples to a first vehicle and communicates acoustically. A second acoustic modem couples to a second vehicle and communicates acoustically with the first acoustic modem. A first computer system receives an environmental parameter and updates a physical layer parameter of the subsea telecommunication system in real time in response to the environmental parameter.

In another example, a method of updating a subsea telecommunication system includes measuring one or more environmental parameters. The method characterizes noise in an acoustic communication channel in response to the one or more environmental parameters. The method characterizes the acoustic communication channel in response to the one or more environmental parameters. The method conducts a communication performance simulation with the characterized noise channel and the acoustic communication channel. The method determines a physical layer parameter in response to the communication performance simulation. The method also transmits the physical layer parameter to an underwater vehicle in real time during a mission.

In another example, a computing system includes a processor and a memory system with one or more non-transitory computer-readable medium storing instructions thereon. The processor characterizes noise in a subsea acoustic communication channel in response to one or more environmental parameters. The processor characterizes the subsea acoustic communication channel in response to the one or more environmental parameters. The processor conducts a communication performance simulation with the characterized noise channel and the subsea acoustic communication channel. The processor determines a physical layer parameter in response to the communication performance simulation. The processor transmits the physical layer parameter to an underwater vehicle in real time during a mission.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a flowchart of a method for setting a data layer of a subsea telecommunications system, according to embodiments of the present disclosure;

FIG. 4 is a flowchart of a method for setting a data layer of a subsea telecommunications system, according to embodiments of the present disclosure; and FIG. 5 is a flowchart of a method for setting a data layer of a subsea telecommunications system, according to embodiments of the present disclosure.

DETAILED DESCRIPTION

Figure 1:
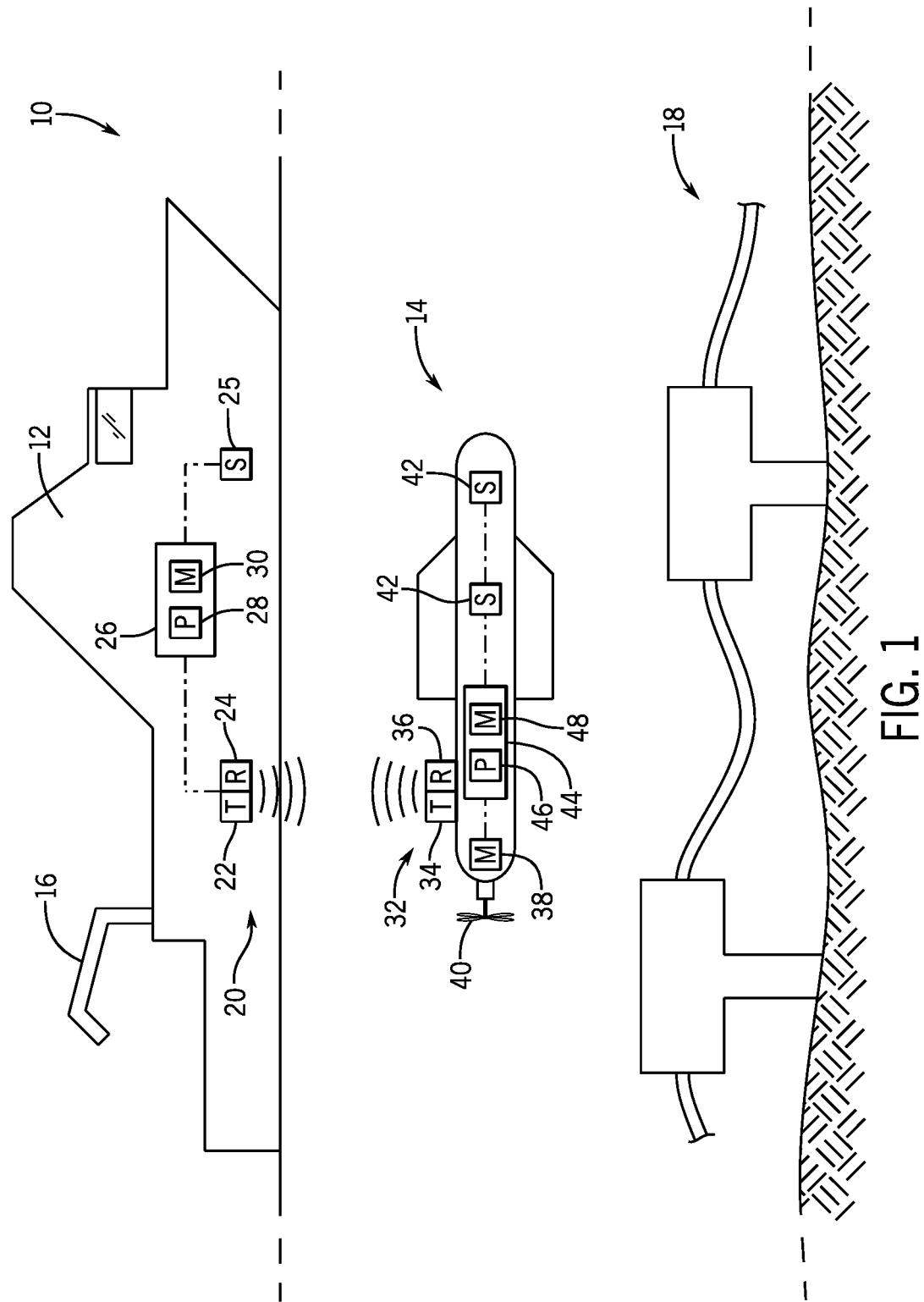
FIG. 1 is a schematic view of a subsea telecommunications system, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As explained above, subsea drilling and extraction operations can be very expensive. Accordingly, these subsea operations are monitored to check for equipment integrity, compliance with regulations, among other reasons. However, the harsh sea environment and size of the equipment used in drilling and extracting, may make fixed equipment monitoring and cable connections undesirable. System operators may therefore use underwater vehicles to monitor this equipment. The underwater vehicles may collect information regarding the operation and condition of the systems using a variety of sensors. The information collected by these sensors is transmitted to the surface using acoustic telecommunication. However, the underwater acoustic environment is dynamic. For example, surface and underwater vessels move with respect to each other. Acoustic reflections on the seabed and surface may also change as the underwater vehicles and surfaces vessels move. The presence of thermoclines may cause acoustic signals (e.g., acoustic rays) to bend. In addition, noise generated by propellers, thrusters, or other active subsea equipment can create large acoustic noise signatures. These combined effects of noise and variation in the propagation of the acoustic signal can interfere with the reliability and transmission of information through acoustic telecommunication.

The subsea telecommunication system discussed below updates physical layer parameters and data delivery parameters in real time in response to changes in the acoustic communication channel and acoustic noise as the underwater vehicle conducts missions. The ability to update physical layer parameters and data delivery parameters in real time increases the reliability and the transmission of data to and from the underwater vehicle during a mission (e.g., monitoring, mapping) as well as saves the time typically involved in surfacing the underwater vehicle to provide parameter updates.

FIG. 1 is a schematic view of a subsea telecommunications system 10 capable of changing physical layer parameters and data delivery parameters in real time. As explained above, the subsea environment provides a challenging environment for wireless communication (e.g., acoustic telecommunication). The ability to change physical layer parameters and/or data delivery parameters of the subsea telecommunications system 10 in real-time may save time and improve communication between surface vessels and underwater vehicles, as well as between one or more underwater vehicles.

The subsea telecommunications system 10 may include one or more surface vessels 12 (e.g., boat, ship, platforms) and one or more underwater vehicles 14 (e.g., autonomous underwater vehicles, unmanned undersea vehicles, remotely operated underwater vehicles). The surface vessel 12 may include a crane 16 that enables deployment and retrieval of the underwater vehicle 14. For example, the surface vessel 12 may carry the underwater vehicle 14 to a deployment site where it is deployed. The deployment site may include a variety of oil and gas infrastructure 18 such as production pipes, subsea wellheads, risers, pumping equipment, among others. At the deployment site, the surface vessel 12 deploys the underwater vehicle 14 to conduct maintenance, inspection, mapping, research, among other tasks.

In order to wirelessly communicate with the underwater vehicle 14, the surface vessel 12 includes one or more modems 20 (e.g., acoustic modem). The modem 20 includes one or more transmitters 22 and one or more receivers 24. In operation, the modem 20 enables subsea acoustic communication with one or more underwater vehicles 14 by transmitting data with the transmitter 22 and receiving data with the receiver 24. As will be explained below, the modem 20 couples to a computer system 26 (e.g., controller) that changes the physical layer parameters and/or the data layer parameters of the modem 20 in response to subsea conditions detected with sensors on the surface vessel 12 and/or the underwater vehicle 14 (e.g., sensors 25, sensors 42). These subsea conditions (e.g., environmental parameters) may include water temperature (e.g., thermoclines), salinity, sound velocity, acoustic noise (e.g., motors, pumps), among others. By changing the physical layer and/or the data layer of the modem 20, the accuracy, speed, reliability, etc. of communication between the underwater vehicle 14 and the surface vessel 12 may increase.

The computer system 26 includes a processor 28 and a memory 30. For example, the processor 28 may be a microprocessor that executes software to change the physical layer parameters, the data delivery parameters, process data received from the underwater vehicle 14 (e.g., sensors 42), control the surface vessel 12, among others. The processor 28 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 28 may include one or more reduced instruction set (RISC) processors.

The memory 30 may include a volatile memory, such as random access memory (RAM), and/or a nonvolatile memory, such as read-only memory (ROM). The memory 30 may store a variety of information and may be used for various purposes. For example, the memory 30 may store processor executable instructions, such as firmware or software, for the processor 28 to execute. The memory 30 may include ROM, flash memory, a hard drive, or any other suitable optical, magnetic, or solid-state storage medium, or a combination thereof. The memory 30 may store data, instructions, and any other suitable data.

As illustrated, the underwater vehicle 14 similarly includes one or more modems 32 (e.g., acoustic modem).

The modem 32 includes one or more transmitters 34 and one or more receivers 36. In operation, the modem 32 communicates (e.g., acoustic telecommunication) with the modem 20 (e.g., surface vessel modem) and/or with the modems of other underwater vehicles 14. In order to move around, the underwater vehicle 14 includes a motor 38 that may drive a propeller 40. The underwater vehicle 14 also includes one or more sensors 42. These sensors 42 may be salinity sensors, temperature sensors, cameras (e.g., infrared, optical), chemical sensors, radar, etc. In operation, the underwater vehicle 14 uses the sensors 42 to sense the conditions of the water, monitor equipment, map, etc. For example, as the underwater vehicle 14 dives toward the target, it collects in-situ information related to the vertical acoustic velocity, the presence of underwater currents and the acoustic noise level near the target. Data from the sensors 42 may be received by a computer system 44 (e.g., controller) on the underwater vehicle 14, which then processes and/or transfers the data to the modem 32 for transmission to the surface vessel 12. The computer system 44, may include a processor 46 and a memory 48.

During operation, the computer system 44 may process incoming communication from other modems (e.g., modem 20) as well as transmit data through the modem 32 (e.g., sensor data). For example, the computer system 44 may receive instructions from the computer system 26 to change physical and/or data layers of the modem 32. The computer system 44 may also receive travel instructions (e.g., travel coordinates), speed of travel instructions, sensor instructions (e.g., camera movement instructions), among others.

Figure 2:
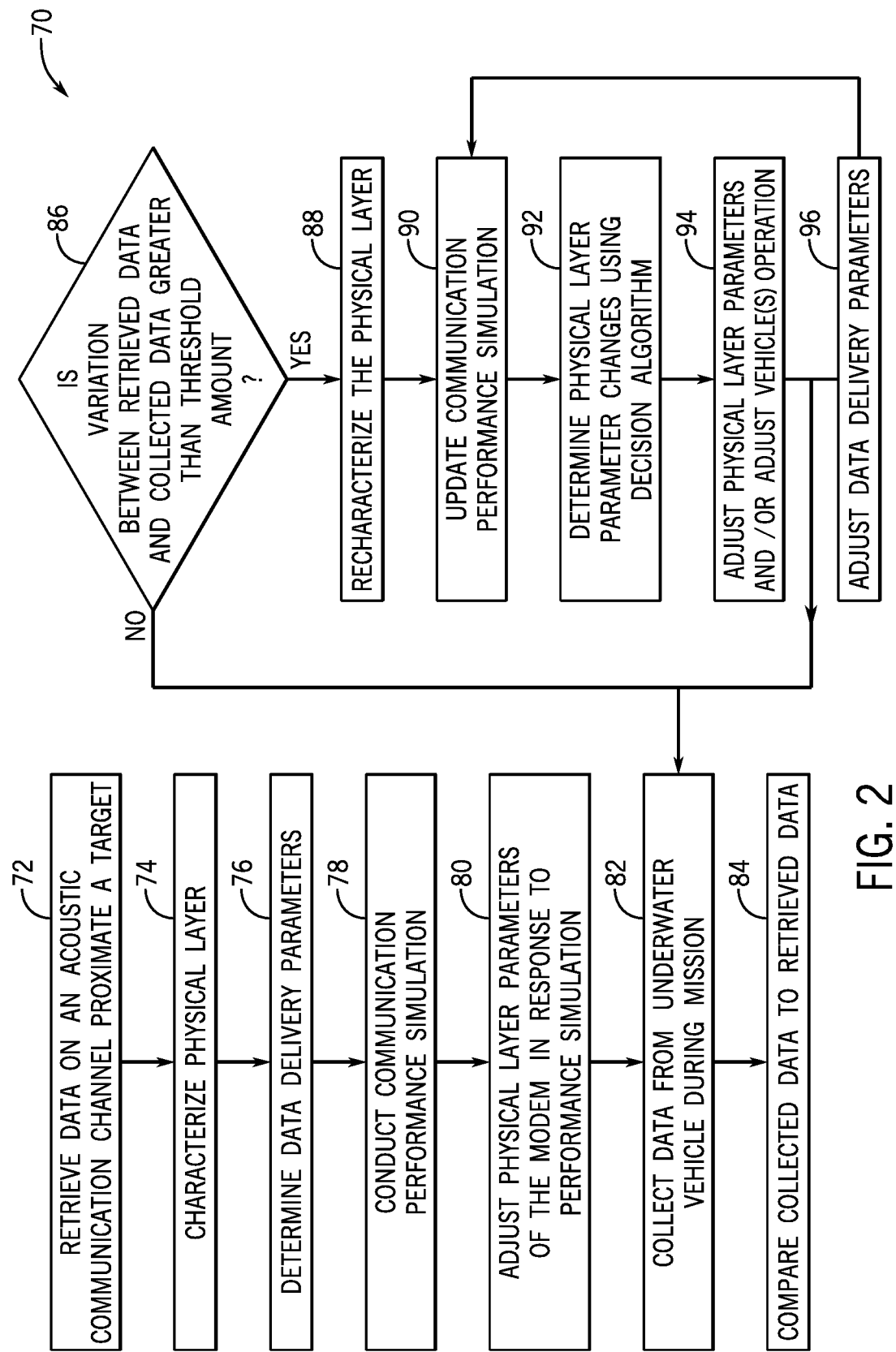
FIG. 2 is a flowchart of a method for setting a physical layer of a subsea telecommunications system, according to embodiments of the present disclosure.

FIG. 2 is a flowchart of a method 70 for setting a physical layer of a subsea telecommunications system 10. The method 70 may begin by retrieving data on an acoustic communication channel and/or noise proximate a target area of operation, step 72. The retrieved data may include historical and/or predicted salinity, water temperature, acoustic noise (e.g., manmade, geological), thermoclines, sound velocity, among others. The method 70 then characterizes the physical layer of the subsea telecommunication system 10, step 74. The physical layer is characterized by characterizing the acoustic communication channel and the noise in the acoustic communication channel.

In order to characterize the acoustic communication channel, the method 70 may predict a sound velocity profile, predict a channel spread, simulate a Doppler shift, or a combination thereof. The method 70 may characterize the noise using time analysis of the noise (e.g., energy, peak-peak, median, sliding average, peak detection), spectral analysis of the noise frequency (e.g., fast Fourier transform, Welch's average, parametric spectral analysis), time frequency analysis of the evolution of the noise frequency over time (e.g., Fourier transform, Wigner-Ville, wavelets), and/or statistical analysis of the noise (e.g., Bayesian estimation, percentile), or a combination thereof. The method 70 may also determine the desired data delivery parameters, step 76. Data delivery parameters may include latency, quality (e.g., data fidelity), spatial resolution, temporal resolution, etc. of the different data feeds. These data delivery parameters may be determined based on the intended operation of the underwater vehicle 14 and/or provided by an operator (e.g., personal preferences). For example, will the underwater vehicle be traversing, hovering, inspecting (e.g., inspecting equipment, pipeline).

The method 70 then conducts a communication performance simulation for the acoustic communication channel using the characterization of the physical layer and the data delivery parameters, step 78. The communication performance simulation may include estimating a propagation channel using a ray-tracing technique and/or using a sound velocity profile. The Doppler Effect may be simulated using the laws of mechanics. Acoustic noise may be simulated in accordance with historic values and/or predicted values including signal level, energy distribution across bandwidth, etc. One or several simulated telecommunication signals with fixed parameters (e.g., carrier frequency, data rate, constellation order) are then generated and propagated using the simulated physical layer parameters and data delivery parameters. For example, two or more sets of different data delivery parameters and/or physical layer parameters may be used in the simulated telecommunication signals. The communication performance simulation may then estimate the reliability and performances of the simulated telecommunication signals. The results obtained using the different telecommunications parameters (e.g., physical layer parameters, data delivery parameters) are compared, and the set of parameters (e.g., physical layer parameters, data delivery parameters) accounting for the best performance may be selected.

After performing the communication performance simulation, the method 70 may adjust the physical layer parameters of the subsea telecommunication system 10 (e.g., modems 20 and 32), step 80. Physical layer parameters may include carrier frequency, bandwidth, error correcting codes, modulation order, symbol rate, among others.

After adjusting the physical layer parameters, the underwater vehicle 14 may be launched. As the underwater vehicle 14 navigates to the target location (e.g., dives), the underwater vehicle 14 transmits data to the surface vessel 12. The transmitted data may include salinity data, temperature data, acoustic noise data, sound velocity data, among others. The method 70 collects this data from the underwater vehicle 14 during the mission, step 82. In some embodiments, the data from the underwater vehicle 14 is analyzed and compared to the retrieved data (e.g., historical and/or predicted data) used to characterize the physical layer, step 84. The method 70 determines if the variation between the data used to characterize the physical layer and the data collected during the dive is greater than a threshold difference, step 86. For example, is the noise greater or less than expected. If the difference does not exceed a threshold, the physical layer parameters remain the same and the method 70 continues to collect data from the underwater vehicle 14, step 82. If the difference exceeds the threshold, the method 70 recharacterizes the physical layer (e.g., acoustic communication channel, noise in the acoustic communication channel), step 88. Recharacterizing the acoustic communication channel of the physical layer may include measuring a sound profile during the dive and/or using an acoustic transducer and acoustic receiver (e.g., secondary sensor) located at a known distance from each other. Recharacterizing the acoustic communication channel may also include measuring a Doppler shift using pilot sequences transmitted from the surface vessel 12 and/or the underwater vehicle 14. Furthermore, recharacterizing the acoustic communication channel may also include measuring a channel spread using pilot sequences transmitted from the surface vessel 12 and/or the underwater vehicle 14.

After recharacterizing the physical layer, the method 70 updates the communication performance simulation with the recharacterized physical layer and the data delivery parameters, step 90. In other words, the method 70 reruns the communication performance simulation. In response to the results of the updated communication performance simulation, the method 70 determines the physical layer parameters changes using a decision algorithm and/or using feedback from an operator, step 92.

After determining the changes to the physical layer parameters, the method 70 adjusts the physical layer parameters and/or adjusts vehicle operation, 94. Vehicle operation adjustments, may include changing the position of the surface vessel 12 (e.g., position of the surface vessel 12 with respect to the underwater vehicle 14), changing the position of the underwater vehicle 14 (e.g., the position of the underwater vehicle 14 with respect to the surface vessel 12), changing the speed of the surface vessel 12 (e.g., acoustic signature), changing the speed of the underwater vehicle 14 (e.g., acoustic signature), changing the depth of the underwater vehicle 14, or a combination thereof. These changes may improve communication by reducing distance between the surface vessel 12 and the underwater vehicle 14, align modems, reduce acoustic noise (e.g., acoustic noise generated by the motors of the surface vessel 12, the underwater vehicle 14), etc. After adjusting the physical layer parameters and/or vehicle parameters the method 70 returns to the collection of data from the underwater vehicle 14 during the mission, step 82.

In some embodiments, as the mission or operation of the underwater vehicle 14 changes (e.g., traversing, hovering, inspecting), the method 70 may adjust the data delivery parameters, step 96. The adjustment may be automatic in response to detecting the operation of the underwater vehicle 14 and/or with input from an operator. Once the data delivery parameters change, the method 70 may return to step 90 and update the communication performance simulation to optimize acoustic telecommunication, step 90.

FIG. 3 is a flowchart of a method 110 for setting a data layer of a subsea telecommunications system 10. As explained above, the underwater vehicle 14 may operate in different modes (e.g., traversing, hovering, inspecting). Depending on the mode of operation, a certain set of data delivery parameters may be selected (e.g., latency, data fidelity, spatial resolution, temporal resolution of all the different data feeds). For example, a real-time video feed may be transmitted from the underwater vehicle 14 to the surface vessel 12 while inspecting equipment. In this situation, the quality and resolution of each frame may be more important than latency and the temporal resolution of the video feed. In another mode of operation, such as steering, minimizing the latency of the data feed may be more important than other parameters. Data delivery parameters may also be selected that facilitate transmission of different data streams (e.g., the transmission of the video and sonar measurements). For example, data delivery parameters may be selected that enhance communication robustness for multiple data streams.

The method 110 begins by determining the underwater vehicle's mode of operation, step 112. The mode of operation may be determined by a user, machine learning, and/or signal processing algorithms. For example, an operator may determine that the underwater vehicle 14 is approaching a target location and that the underwater vehicle 14 will then operate in an inspection mode. The method 110 may then determine data delivery parameters using an algorithm in response to the mode of operation, step 114. The data delivery parameters are then transmitted to the underwater vehicle, step 116. The underwater vehicle 14 receives the data delivery parameters, step 118. The underwater vehicle 14 then updates the data delivery parameters, step 120. In some embodiments, the method 110 may include transmission of an acknowledgement from the underwater vehicle 14 that the parameters have been updated.

FIG. 4 is a flowchart of a method 130 for setting a data layer of a subsea telecommunications system 10. The method 130 begins by selecting desired data delivery parameters, step 132. For example, an operator may bypass a decision algorithm and select desired data delivery parameters for a specific type of data transmission (e.g., video feed for inspecting equipment, steering). The method 130 then transmits the data delivery parameters to the underwater vehicle 14 (e.g., transmit from the surface vessel 12), step 134. The underwater vehicle 14 receives the data delivery parameters, step 136. The underwater vehicle 14 then updates the data delivery parameters, step 138. In some embodiments, the method 130 may include transmission of an acknowledgement from the underwater vehicle 14 that the parameters have been updated.

FIG. 5 is a flowchart of a method 150 for setting a data layer of a subsea telecommunications system 10. The method 150 begins by determining the underwater vehicle's mode of operation, step 152. The mode of operation may be determined through machine learning and/or signal processing algorithms. For example, the underwater vehicle 14 may determine that the underwater vehicle 14 is in a steering mode, hovering mode, or an inspection mode. The method 150 may then determine data delivery parameters in response to the mode of operation (e.g., determine data delivery parameters using an algorithm), step 154. The underwater vehicle 14 then updates the data delivery parameters, step 156. In some embodiments, the method 150 may include transmission of an acknowledgement from the underwater vehicle 14 that the parameters have been updated.

Technical effects of the disclosure include a subsea communication system that updates physical layer parameters and data delivery parameters in real time in response to changes in the acoustic communication channel, acoustic noise, and underwater vehicle operation modes. The ability to update physical layer parameters and data delivery parameters in real time increases the reliability and the transmission of data to and from the underwater vehicle during a mission.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A subsea telecommunication system, comprising:
   a first acoustic modem configured to couple to a first vehicle and to communicate acoustically;
   a second acoustic modem configured to couple to a second vehicle and to communicate acoustically with the first acoustic modem; and
   a first computer system configured to:
      receive an environmental parameter;
      characterize noise in an acoustic communication channel based on the environmental parameter;
      characterize the acoustic communication channel based on the environmental parameter;
      characterize a physical layer parameter based on the noise in the acoustic communication channel and the acoustic communication channel;
      receive a first mode of operation of the second vehicle, the first mode of operation being a traversing mode or an inspecting mode;
      determine a plurality of data delivery parameters corresponding to the first mode of operation of the second vehicle, the data delivery parameters including at least one of latency of a data feed from the second vehicle, fidelity of the data feed, spatial resolution of the data feed, or temporal resolution of the data feed, wherein:
         when the first mode of operation is the traversing mode, the latency of the data feed is prioritized over the fidelity of the data feed; and
         when the first mode of operation is the inspecting mode, the fidelity of the data feed is prioritized over the latency of the data feed;
      prior to communicating acoustically with the second vehicle through water:
         conduct a communication performance simulation of the acoustic communication channel with the characterized physical layer parameter and the determined plurality of data delivery parameters; and
         adjust the physical layer parameter in response to the communication performance simulation;
      receive data acoustically through the water from the second vehicle while the second vehicle operates at the first mode of operation;
      determine that a variation between the characterized physical layer and the data from the second vehicle exceeds a threshold;
      recharacterize the physical layer in response to the variation exceeding the threshold, and update the communication performance simulation;
      detect the second vehicle changes operation from the first mode of operation to a second mode of operation by receiving the second mode of operation from the second vehicle, wherein the second mode of operation is different from the first mode of operation, and is one of the traversing mode or the inspecting mode;
      adjust the data delivery parameters to correspond to the second mode of operation received from the second vehicle, wherein the data delivery parameters are prioritized according to the second mode of operation;
      further update the communication performance simulation using the adjusted data delivery parameters; and
      transmit the data delivery parameters corresponding to the second mode of operation received from the second vehicle to the second vehicle, the second vehicle configured to operate based on the data delivery parameters.

2. The subsea telecommunication system of claim 1, comprising the second vehicle, wherein the second vehicle is an underwater vehicle.

3. The subsea telecommunication system of claim 1, comprising one or more sensors configured to detect the environmental parameter.

4. The subsea telecommunication system of claim 1, wherein the environmental parameter comprises underwater currents, acoustic noise, temperature, salinity, sound velocity, or a combination thereof.

5. The subsea telecommunication system of claim 1, wherein the second acoustic modem is configured to receive data from a sensor and transmit the data to the first acoustic modem.

6. The subsea telecommunication system of claim 5, wherein the sensor comprises a camera.

7. The subsea telecommunication system of claim 6, further comprising a second computer system configured to receive the plurality of data delivery parameters from the first computer system.

8. A method of updating a subsea telecommunication system, the method comprising:
   measuring one or more environmental parameters;
   characterizing noise in an acoustic communication channel based on the one or more environmental parameters;
   characterizing the acoustic communication channel based on the one or more environmental parameters;
   characterizing a physical layer parameter based on the noise in the acoustic communication channel and the acoustic communication channel;
   selecting a first mode of operation of an underwater vehicle, wherein the first mode of operation is one of a traversing mode or an inspecting mode;
   determining a plurality of data delivery parameters corresponding to the first mode of operation of the underwater vehicle, the data delivery parameters including at least one of latency of a data feed from the underwater vehicle, fidelity of the data feed, spatial resolution of the data feed, or temporal resolution of the data feed, wherein:
      when the first mode of operation is the traversing mode, the latency of the data feed is prioritized over the fidelity of the data feed; and
      when the first mode of operation is the inspecting mode, the fidelity of the data feed is prioritized over the latency of the data feed;
   prior to communicating acoustically with the underwater vehicle through water:
      conducting a communication performance simulation of the acoustic communication channel with the characterized physical layer parameter and the determined plurality of data delivery parameters; and adjusting the physical layer parameter in response to the communication performance simulation;

receiving data acoustically through the water from the underwater vehicle while operating the underwater vehicle at the first mode of operation;

determining that a variation between the characterized physical layer and the data from the underwater vehicle exceeds a threshold;

recharacterizing the physical layer in response to the variation exceeding the threshold, and updating the communication performance simulation;

detecting the underwater vehicle changes operation from the first mode of operation to a second mode of operation, wherein the second mode of operation is different from the first mode of operation, and is one of the traversing mode or the inspecting mode;

adjusting the data delivery parameters to correspond to the second mode of operation, wherein the data delivery parameters are prioritized according to the second mode of operation; and further updating the communication performance simulation using the adjusted data delivery parameters.

9. The method of claim 8, wherein the one or more environmental parameters comprises underwater currents, acoustic noise, temperature, salinity, sound velocity, or a combination thereof.

10. The method of claim 8, wherein the physical layer parameter comprises carrier frequency, bandwidth, error correcting codes, modulation order, symbol rate, or a combination thereof.

11. The method of claim 8, comprising controlling the underwater vehicle in response to the communication performance simulation.

12. The method of claim 8, comprising characterizing the noise using time analysis, spectral analysis, time-frequency analysis, statistical analysis, or a combination thereof.

13. The method of claim 8, comprising characterizing the acoustic communication channel using a sound velocity profile, a channel spread, a Doppler shift, or a combination thereof.

14. The method of claim 8, wherein the plurality of data delivery parameters comprises at least a first set of data delivery parameters corresponding to the traversing mode of the underwater vehicle, and a second set of data delivery parameters corresponding to the inspecting mode of the underwater vehicle.

15. A computing system, comprising:
a processor; and
a memory system including one or more non-transitory computer-readable medium storing instructions thereon that, when executed by the processor, cause the computing system to:
characterize noise in a subsea acoustic communication channel based on one or more environmental parameters;
characterize the subsea acoustic communication channel based on the one or more environmental parameters;
characterize a physical layer parameter based on the noise in the subsea acoustic communication channel and the subsea acoustic communication channel;
determine a plurality of data delivery parameters corresponding to a selected first mode of operation of an underwater vehicle, wherein:
the first mode of operation is one of a traversing mode or an inspecting mode;
the data delivery parameters include at least one of latency of a data feed from the underwater vehicle, fidelity of the data feed, spatial resolution of the data feed, or temporal resolution of the data feed;
when the first mode of operation is the traversing mode, the latency of the data feed is prioritized over the fidelity of the data feed; and
when the first mode of operation is the inspecting mode, the fidelity of the data feed is prioritized over the latency of the data feed; prior to communicating acoustically with the underwater vehicle through water:
conduct a communication performance simulation of the acoustic communication channel with the characterized physical layer parameter and the determined plurality of data delivery parameters; and
adjust the physical layer parameter in response to the communication performance simulation;
receive data acoustically through the water from the underwater vehicle;
determine that a variation between the characterized physical layer and the data from the underwater vehicle exceeds a threshold;
recharacterize the physical layer if in response to the variation exceeding the threshold, and update the communication performance simulation;
detect the underwater vehicle changes operation from the first mode of operation to a second mode of operation, wherein the second mode of operation is different from the first mode of operation, and is one of the traversing mode or the inspecting mode;
adjust the data delivery parameters to correspond to the second mode of operation, wherein the data delivery parameters are prioritized according to the second mode of operation; and
further update the communication performance simulation using the adjusted data delivery parameters.

16. The method of claim 14, wherein:
when the first or second mode of operation comprises the traversing mode, the method further comprises transmitting the first set of data delivery parameters to the underwater vehicle; and
when the first or second mode of operation comprises the inspecting mode, the method further comprises transmitting the second set of data delivery parameters to the underwater vehicle.

* * * * *